United States Patent
Mercea et al.

(10) Patent No.: US 9,081,569 B2
(45) Date of Patent: Jul. 14, 2015

(54) ACTIVE STYLUS FORCE SENSING MECHANISM FOR GENERATING A WAKEUP INTERRUPT TO THE CONTROLLER

(71) Applicant: Research In Motion Limited, Waterloo (CA)

(72) Inventors: Cornel Mercea, Waterloo (CA); Peter Mankowski, Waterloo (CA); James Alexander Robinson, Elmira (CA); Jacek S. Idzik, Kenilworth (CA)

(73) Assignee: BlackBerry Limited, Waterloo, Ontario (CA)

( * ) Notice: Subject to any disclaimer, the term of this patent is extended or adjusted under 35 U.S.C. 154(b) by 186 days.

(21) Appl. No.: 13/710,437

(22) Filed: Dec. 10, 2012

(65) Prior Publication Data
US 2014/0160088 A1    Jun. 12, 2014

(51) Int. Cl.
*G06F 3/033* (2013.01)
*G06F 1/32* (2006.01)
*G06F 3/0354* (2013.01)

(52) U.S. Cl.
CPC ............ *G06F 1/3206* (2013.01); *G06F 1/3259* (2013.01); *G06F 1/3262* (2013.01); *G06F 3/03545* (2013.01)

(58) Field of Classification Search
USPC ......................................................... 345/179
See application file for complete search history.

(56) References Cited

U.S. PATENT DOCUMENTS

| 6,445,383 B1 | 9/2002 | Chambers et al. |
| 2007/0014490 A1 | 1/2007 | Silverbrook et al. |
| 2010/0085325 A1 * | 4/2010 | King-Smith et al. ......... 345/174 |

FOREIGN PATENT DOCUMENTS

| DE | 202012102253 | 7/2012 | |
| WO | WO 03/069547 | 3/2003 | |
| WO | WO 03069547 A1 * | 8/2003 | |
| WO | WO 2004/066473 | 8/2004 | |
| WO | WO 2004066473 A1 * | 8/2004 | |
| WO | WO2014066473 A1 * | 8/2004 | ............... H02J 7/00 |

OTHER PUBLICATIONS

European Search Report, EP12196389.6, Apr. 23, 2013.

* cited by examiner

*Primary Examiner* — Charles V Hicks
*Assistant Examiner* — Jeffrey S Steinberg
(74) *Attorney, Agent, or Firm* — Jon Gibbons; Fleit Gibbons Gutman Bongini & Bianco P.L.

(57) ABSTRACT

An active stylus having a control circuit configured to wake up the stylus from a sleep mode to an active mode in response to pressure applied to a tip of the stylus. The stylus includes a force sensor electrically coupled to a power source, an operational amplifier, and a voltage level comparator, the voltage level comparator configured to output a digital wake up interrupt signal when pressure is applied to the tip when the control circuit is in the sleep mode. The operational amplifier is configured to provide an analog signal representative of varying pressure on the tip. This signal is processed by the control circuit such that the stylus goes into the sleep mode after a specified period of time following cessation of variations in the analog signal.

14 Claims, 6 Drawing Sheets

ACTIVE STYLUS FORCE SENSING MECHANISM FOR GENERATING A WAKEUP INTERRUPT TO THE CONTROLLER

BACKGROUND

Stylus pointing devices are utilized to input information and/or to control applications executing on a host electronic device. A stylus may be characterized as active or passive. An active stylus emits signals that are detected by the host device and processed to control an application. A passive stylus modifies an electrical property, such as the capacitance or resistance of a display surface or assembly of the host device. When the stylus tip is brought into close proximity to the display, the position thereof can be determined in several ways, such as, for example by: the effect of the stylus on the electrical properties of the display (i.e., by sensing electromagnetic induction, changes in electrical resistance, variance in electrical capacitance, and the like); changes in the optical properties of the tablet; processing ultrasonic/optical signals, etc.

In the instance of an active stylus that emits radio signals, a radio transmitter associated with the stylus generates and radiates an electromagnetic field that is sensed and processed by the host to yield a stylus position. The active stylus circuitry requires battery power, the output of which is limited by size constraints.

It would therefore be desirable to provide an expedient for extending battery life when the device is not in use, without requiring the user to take active steps to power down the stylus.

BRIEF DESCRIPTION OF THE DRAWINGS

Exemplary embodiments of the disclosure will be described below with reference to the included drawings such that like reference numerals refer to like elements and in which.

DETAILED DESCRIPTION

Figure 1:
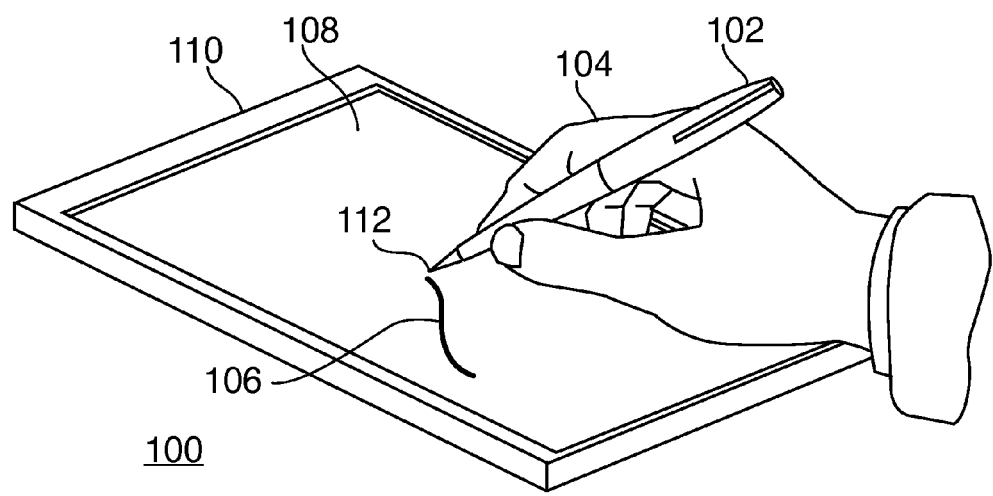
FIG. 1 is a schematic diagram of an active stylus and host electronic device in a representative electronic drawing application.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

In accordance with an aspect of the disclosure there is provided an active stylus having a control circuit configured to wake up the stylus from a sleep mode to an active mode in response to pressure applied to a tip of the stylus. The stylus includes a force sensor electrically coupled to a power source, an operational amplifier, and a voltage level comparator, the voltage level comparator configured to output a digital wake up interrupt signal when pressure is applied to the tip when the control circuit is in the sleep mode. The operational amplifier is configured to provide an analog signal representative of varying pressure on the tip. This signal is processed by the control circuit such that the stylus goes into the sleep mode after a specified period of time following cessation of variations in the analog signal.

In accordance with another aspect of the disclosure, there is provided a method for saving battery power in an active stylus. The method generally includes the steps of: receiving a variable input voltage at an operational amplifier and a voltage level comparator in response to pressure applied to a tip of the stylus; generating a digital interrupt signal from the voltage level comparator when the input voltage exceeds a threshold value, the interrupt signal operable to wake up the active stylus from a sleep mode; generating an analog signal representative of varying pressure applied to the tip and monitoring the analog signal; and powering down the stylus to a sleep mode after an elapsed period of time following no fluctuations in the analog signal.

FIG. 1 is a schematic diagram of an exemplary drawing system 100 in accordance with an aspect of the disclosure. In FIG. 1, an electronic input tool (active stylus) 102 is manipulated by a user 104 to draw a line or other image 106 on a display 108 of a host electronic device 110. The display 108 comprises elements responsive to a signal transmitted from a tip 112 of the stylus 102. In an exemplary embodiment, the host electronic device 110 includes a radio frequency sensor grid. Alternatively, the electronic device 110 may utilize infrared, optical or ultrasonic sensors of the type known in the art. The display 108 may also include a capacitive or resistive touch screen. An exemplary host electronic device 110 may be a laptop computer, tablet computer (tablet), mobile telephone, smart-phone, personal digital assistant (PDA), or any other portable or non-portable electronic device. To effectuate inputs to the device 110, one or more positions are sensed where the active stylus 102 touches or is otherwise brought into close proximity to the display 108.

Figure 2:
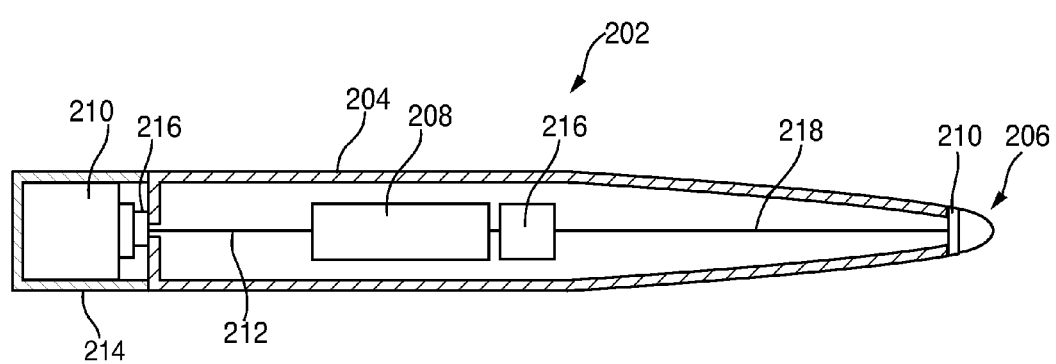
FIG. 2 is a sectional view of an illustrative active stylus in accordance with aspects of the disclosure.

FIG. 2 is a sectional view of an exemplary active stylus 202, comprising a body 204 and a tip 206. A circuit assembly 208 is disposed within the body 204 and configured to transmit a stylus signal to the tip 206 to enable electronic inputs to be made to the host electronic device. The stylus signal may be transmitted via a wire, the body 204, or a surface coating on the body 204. In an exemplary embodiment, the circuit assembly 208 is powered by a battery 210. The battery 210 may be electrically coupled to the circuit assembly 208 via one or more electrical connections 212. In an illustrative embodiment, the body 204, or a coating on the body, is electrically conductive and couples one pole of the battery 210, such as the ground, to the circuit assembly 208. The battery 210 is enclosed in a battery compartment 214 disposed at an end of the body 204 opposite the tip 206 to facilitate replacement. A terminal or contact pad 216 couples the battery to the circuit assembly 208.

The battery electrically communicates with the circuit assembly via a switch including a force sensing mechanism 216. In the illustrative embodiment, the force sensing mechanism 216 is mechanically coupled to the tip 206 via a shaft 218. The shaft may be electrically conductive to couple the circuit assembly 208 to the tip 206. A compliant element 220 reduces the mechanical coupling between the tip 206 and the end of the body, such that a force applied to the tip 206 is transferred to the force activated switch 216 via shaft 218. The compliant element 220 may be an electrical insulator that prevents the stylus signal electrically coupling to the body 204. In this manner, the body 204 may serve as a power supply conductor. For example, the body 204 may be couple to the battery and serve as an electrical ground or supply voltage.

The force-sensing mechanism 216 further comprises a sensor configured to sense forces applied to the tip 206 through changes in electrical resistance. It will be appreciated by those skilled in the art that a decrease in resistance (or increase in conductance) occurs as a piezoelectric element is deformed due to applied force/pressure. In accordance with an aspect of the disclosure, the force signal is utilized to provide a wakeup interrupt to the control circuit 208 as described hereinafter.

Figure 3:
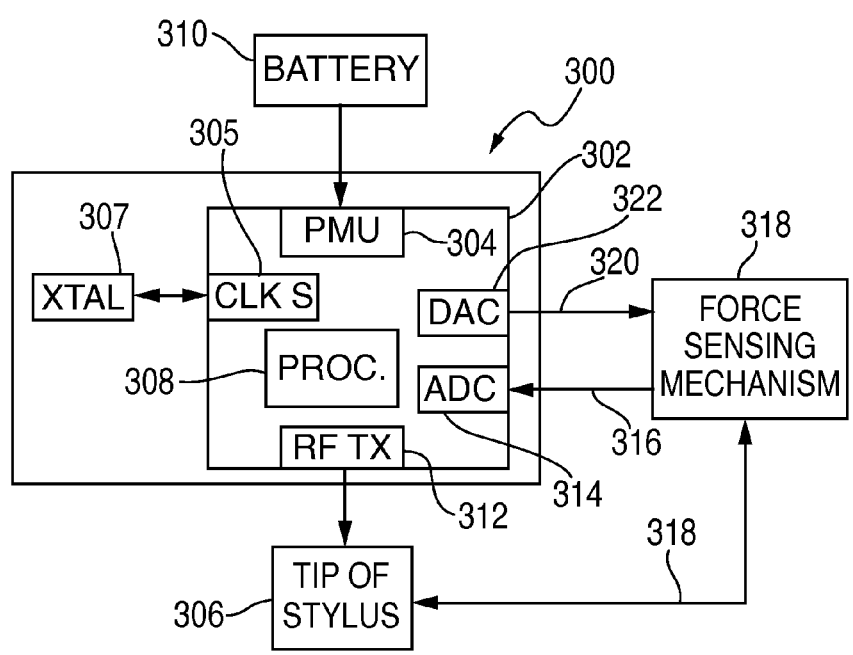
FIG. 3 is a schematic of a control circuit for the active stylus.

FIG. 3 is a block diagram of an exemplary circuit assembly 300 of an active stylus. The circuit assembly 300 includes a control module 302, which may be a micro-controller, a system on a chip (SoC), an assembly of discrete components, an assembly of integrated circuits or a combination thereof. The control module 302 includes power management unit (PMU) 304, which receives power from an external power supply, such as battery 310, and a clock system (CLK S) 304 that receives a timing signal from a crystal (XTAL) 307. The clock system supplies a timing signal to processing core 308. The clock system 304 may also supply a timing signal to a radio transceiver 312. The radio transceiver 312 communicates with the tip 306, which functions as an antenna to transmit radio signals to the host electronic device. The control module 302 further includes an analog-to-digital converter 314, configured to sample a force signal 316 from force-sensing mechanism 318. The force signal is representative of a force applied to the tip 306. The force-sensing mechanism 318 may also receive a signal 320 from the control module 302 via digital-to-analog converter 322.

In the embodiment depicted in FIG. 3, the analog-to-digital converter 314 provides a digital representation of the force signal. The digital representation may comprise one or more bits. For example, an 8-bit converter might be used. When a single bit is used to indicate whether the force signal is above or below a threshold value, the analog-to-digital converter 314 may be replaced by a switch.

Figure 4:
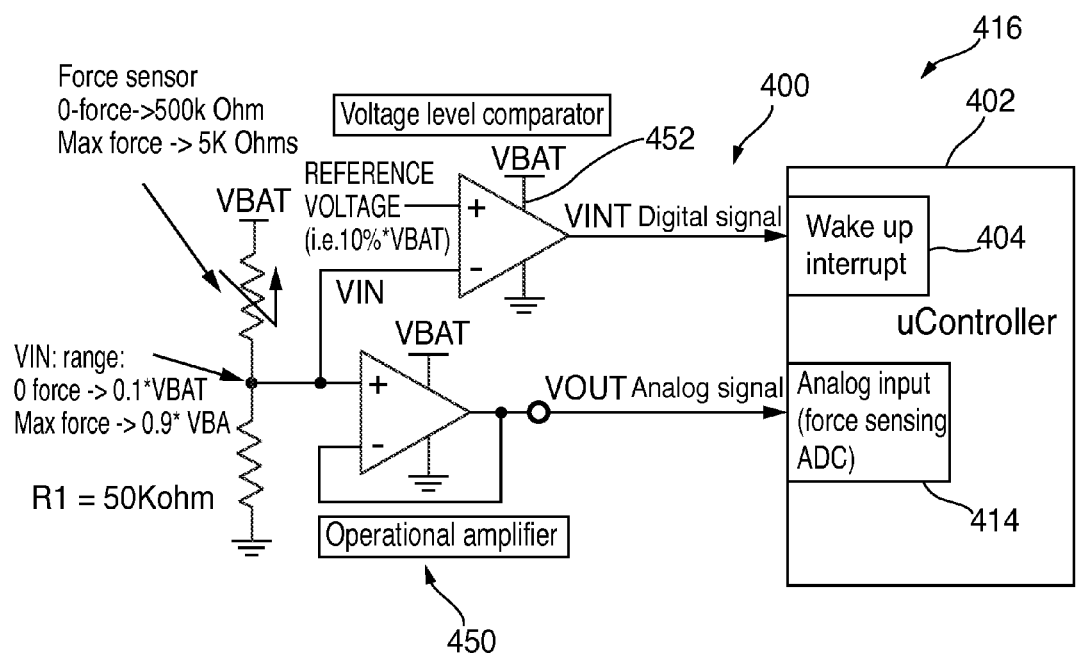
FIG. 4 is a schematic of a wake up circuit in accordance with an aspect of the disclosure.

FIG. 4 is a schematic of an exemplary wakeup circuit 400 in accordance with an aspect of the disclosure. The circuit 400 comprises a force sensor 416 having a variable resistance between 500 kOhms (at zero applied force) and 5 KOhms (at a Max force). The Vin range varies from 0.1*VBAT at zero force to 0.9*VBAT at Max force. An operational amplifier (OpAmp) 450 receives Vin at the positive input (+) as shown, which input is also applied to the negative input (−) of a voltage level comparator (VLComp) 452. The VLComp 452 receives a reference voltage input at the positive input (+) thereof, which is a percentage of the *VBAT voltage (i.e., 10%). The VLComp 452 outputs a VINT digital interrupt signal to the controller 402 that provides a wakeup interrupt 404 when pressure is applied to the force sensor 416 by tapping the tip of the stylus against the display or another surface of the host device. The OpAmp 450 provides an analog output signal (VOUT) representative of the variable force applied to the tip of the stylus as sensed by the force sensor 416. In this expedient, no stimulus from the control circuit 402 is required by the wakeup circuit (its considered passive as it depends only upon battery voltage), thereby considerably reducing power consumption while "asleep." When the system awakens in response to the wakeup interrupt signal, the variable force read by the sensor 416 is converted via an ADC 414 associated with the controller 402 and for as long as this force is sensed, the stylus will remain in an "active" mode. In an active mode, the controller 402 is configured to ignore fluctuations on the interrupt pin and will go into a deep sleep mode only when the controller 402 stops sensing force fluctuations via the analog input (VOUT) for some specified period of time (e.g., one hour). In this manner, power savings are realized by automatically shutting down the active stylus circuitry. An exemplary table of conditions for the following given parameters (VBAT=1.2V, R1=50 kOhms, FSR (Zero force applied)=500 KOhms, FSR (max force applied)=5 KOhms, Reference Voltage=0.1V), is shown below:

| FSR value | VIN | Digital signal level (Wake up interrupt) | System active? | Force reported |
|---|---|---|---|---|
| 500 kOhms | 0.109 V | HI | NO | N/A |
| 499 kOhms | 0.110 V | LOW | YES | minimum |
| 50 KOhms | 0.600 V | LOW | YES | medium |
| 5k (500 g) | 1.090 V | LOW | YES | maximum |

As shown above, in the case where VIN exceeds 0.109V (+hysteresis), the VLComp 452 generates an interrupt signal to the controller 402.

Figure 5:
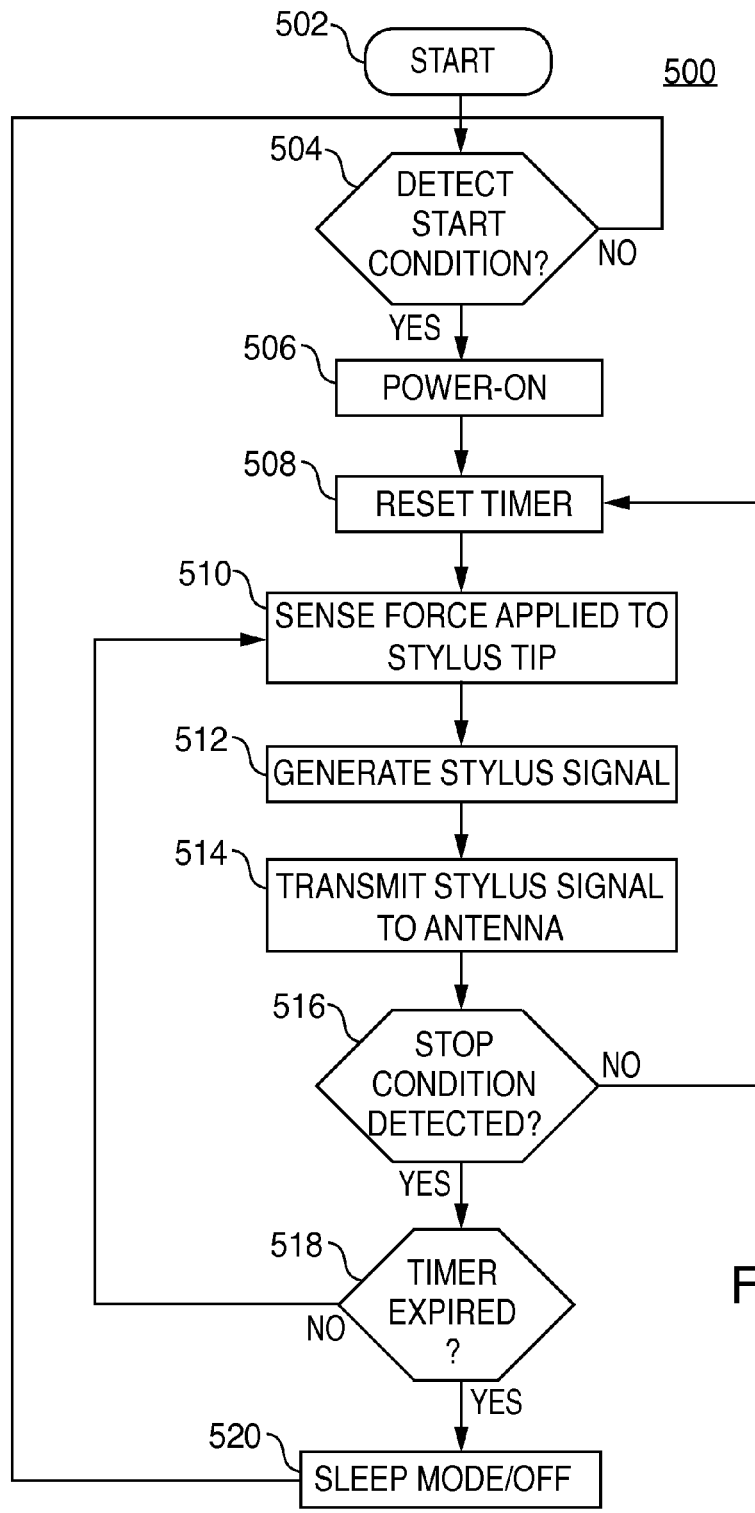
FIG. 5 is a flow diagram of an exemplary method in accordance with an aspect of the disclosure.

FIG. 5 is a flow diagram of a method 500 in accordance with an aspect of the disclosure. At start block 502, the circuit assembly is either powered-off or in a low power mode to conserve battery life. Following start block 502, a start condition is detected at decision block 504. The start condition is initiated by the digital interrupt signal as described in the foregoing when the tip of the stylus is tapped on a display of the host electronic device or another surface. At block 506, the circuit assembly is powered up to enable full operation. When the start condition is initiated via the force activated switch, a timer is reset at block 508. The timer enables the circuit assembly to remain energized for a period of time after the start condition is detected. At block 510, the force applied to the tip is sensed via the force-sensing mechanism, and at block 512, a stylus signal is generated. The stylus signal is transmitted to the antenna at block 514. At decision block 516, a stop condition is detected. The stop condition may be, for example, a user-activated switch, an absence of force on the force-activated switch as represented by the analog signal VOUT described above, or tapping of the stylus tip on a surface. If a stop condition is not detected, as depicted by the negative branch from decision block 516, flow returns to block 508 and the timer is reset. If the stop condition is caused by the force activated switch, a check is made at decision block 518 to determine if the timer has expired. If the timer has expired, as depicted by the positive branch from decision block 518, the circuit assembly powers down or enters a low power operating mode at block 520. Similarly, if the stop condition is the result of a user-activated switch or tapping of the tip on a surface, the timer expiration period may be set to zero so that flow continues to block 520 when the stop condition is detected.

Figure 6:
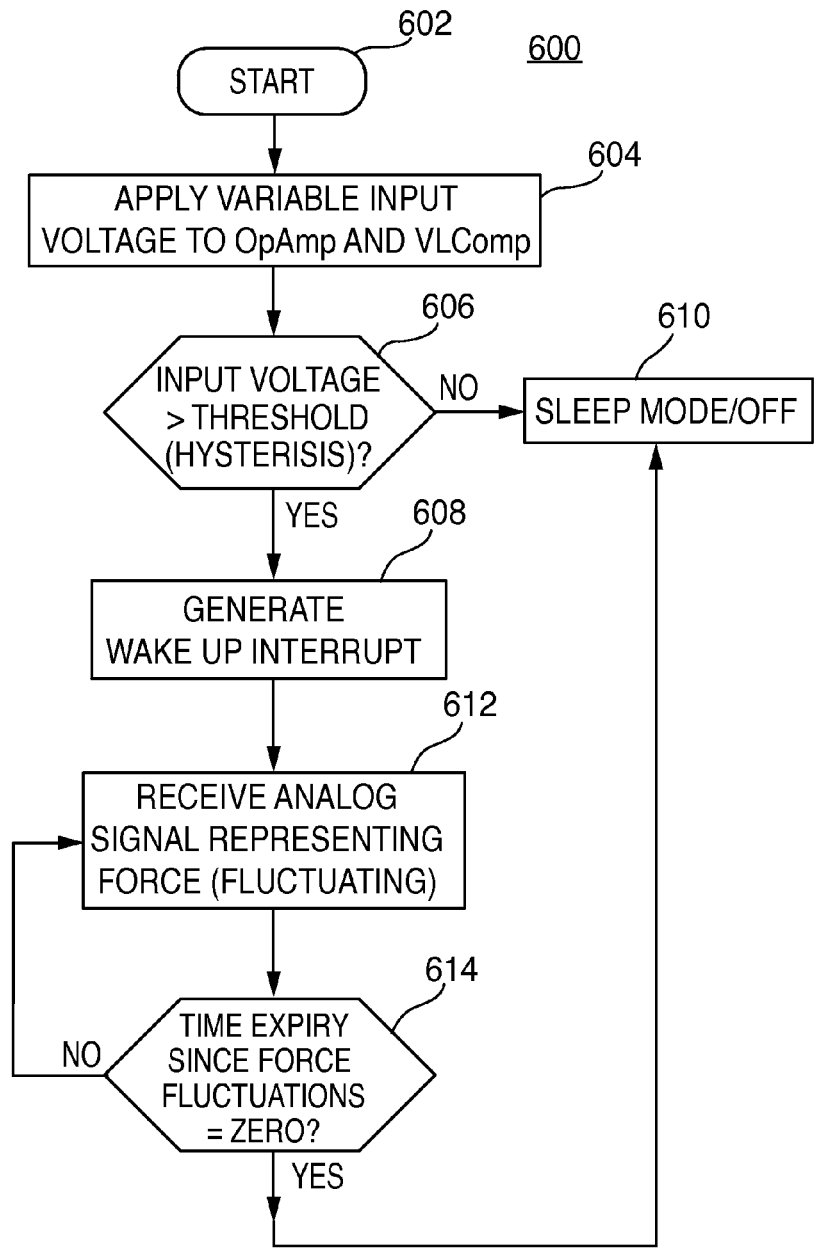
FIG. 6 is a flow diagram of an exemplary method in accordance with an aspect of the disclosure for entering a sleep mode for an active stylus.

FIG. 6 is a flow diagram of a method in accordance with the disclosure for entering a sleep mode for an active stylus. The method starts at block 602. At block 604, a variable voltage (Vin) is applied to the respective inputs of a VLComp and OpAmp as described above. If the Vin exceeds a threshold at decision block 606, then wake-up interrupt is generated at block 608. Otherwise, the active stylus remains in sleep mode (block 610). As the stylus is used, an analog signal is received representing a fluctuating force (block 612). At decision block 614, if a specified period of time has expired since last detecting force fluctuations as represented by the analog output of the OpAmp (VOUT), then the process goes to block 610 (sleep mode). Otherwise, the stylus remains active for as long as force fluctuations are sensed via the analog output.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A stylus for inputting information to a host electronic device, comprising:
    a force sensor electrically operable to produce a force signal in response to pressure applied to a tip of the stylus;
    a voltage level comparator, responsive to the force signal, the voltage level comparator configured to output a digital interrupt signal when the force signal exceeds a reference level;
    an operational amplifier, responsive to the force signal, the operational amplifier configured to output an analog signal representative of varying force on the tip;
    a control circuit, responsive to the digital interrupt signal and the analog signal and configured to switch the stylus between a sleep mode and an active mode,
    where, in the sleep mode, the control circuit is configured to switch from the sleep mode to the active mode in response to the digital interrupt signal, and
    where, in the active mode, the control circuit is configured to monitor the analog signal and switch from the active mode to the sleep mode after a period of time following cessation of variations in the analog signal, the period of time being greater than zero.

2. The stylus of claim 1, where the operational amplifier is coupled in parallel with the voltage level comparator.

3. The stylus of claim 1, wherein the control circuit is programmed to ignore fluctuations in the digital interrupt signal.

4. The stylus of claim 1, wherein the control circuit is programmed to wake up only when in range of a host electronic device.

5. The stylus of claim 1, wherein the sleep mode is a dormant state.

6. A stylus for inputting information to a host electronic device, comprising:
    a control circuit configured to wake up from a sleep mode to an active mode in response to pressure applied to a tip of the stylus; and
    a force sensor, responsive to pressure applied to the tip of the stylus, the force sensor electrically coupled to a power source, an operational amplifier, and a voltage level comparator, the voltage level comparator configured to output a digital wake up interrupt signal when the pressure applied to the tip exceeds a reference value, and the operational amplifier configured to provide an analog signal representative of varying pressure on the tip,
    where, in the sleep mode, the control circuit configured to switch to the active mode in response to the digital wake up interrupt signal, and
    where, in the active mode, the control circuit is configured to go into the sleep mode after a specified period of time following cessation of variations in the analog signal, the specified period of time being greater than zero.

7. The stylus of claim 6, wherein the control circuit is programmed to wake up only when in range of a host electronic device.

8. The stylus of claim 7, wherein the sleep mode is a dormant state.

9. A method for an active stylus, comprising the steps of:
    receiving a variable input voltage at an operational amplifier and a voltage level comparator in response to pressure applied to a tip of the stylus;
    generating a digital interrupt signal from the voltage level comparator when the input voltage exceeds a threshold value, the interrupt signal operable to switch the active stylus from a sleep mode to an active mode;
    generating an analog signal representative of varying pressure applied to the tip of the stylus; and
    when the stylus is in the active mode:
        monitoring the analog signal; and
        powering down the stylus to the sleep mode after an elapsed period of time following no fluctuations in the analog signal.

10. The method of claim 9, where the sleep mode comprises a lower power mode than the active mode.

11. The method of claim 9, where monitoring the analog signal comprises sampling the analog signal in an analog-to-digital converter of a control circuit and where the control circuit is responsive to the digital interrupt signal.

12. The method of claim 9, further comprising, in the active mode:
    resetting a timer when a fluctuation is detected in the analog signal; and
    powering down the stylus to the sleep mode when the timer has expired.

13. The method of claim 9, further comprising, in the active mode:
    generating a stylus signal; and
    transmitting the stylus signal to an antenna of the stylus.

14. The method of claim 9, further comprising, responsive to the digital interrupt signal:
    detecting if the stylus is within range of a host electronic device, and
    entering the active mode if the stylus is within range of the host electronic device.

* * * * *